(12) United States Patent
Freeland et al.

(10) Patent No.: US 12,425,471 B2
(45) Date of Patent: *Sep. 23, 2025

(54) SYSTEM AND METHOD FOR USING A VARIABLE ANALYSIS WINDOW TO PRODUCE STATISTICS ON DOWNLOADABLE MEDIA

(71) Applicant: PODTRAC, INC., Alexandria, VA (US)

(72) Inventors: Robert W. Freeland, Lithia, FL (US); Mark McCrery, Alexandria, VA (US); Jason Defontes, Towson, MD (US)

(73) Assignee: PODTRAC, INC., Alexandria, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/519,066

(22) Filed: Nov. 26, 2023

(65) Prior Publication Data

US 2024/0114067 A1 Apr. 4, 2024

Related U.S. Application Data

(63) Continuation of application No. 17/392,242, filed on Aug. 2, 2021, now Pat. No. 11,831,704, which is a
(Continued)

(51) Int. Cl.
*H04L 43/16* (2022.01)
*G06F 16/17* (2019.01)
*G06F 16/182* (2019.01)
*H04L 43/50* (2022.01)
*H04L 61/5007* (2022.01)
*H04L 67/06* (2022.01)

(52) U.S. Cl.
CPC .......... *H04L 67/06* (2013.01); *G06F 16/1734* (2019.01); *G06F 16/183* (2019.01); *H04L 61/5007* (2022.05)

(58) Field of Classification Search
CPC ..... H04L 43/04; H04L 43/16; H04L 63/1408; H04L 67/535; H04L 12/66; H04L 40/1897; H04L 41/12; G06F 21/6218
See application file for complete search history.

(56) References Cited

U.S. PATENT DOCUMENTS 10,523,715 B1 * 12/2019 Jiang .................... H04L 61/2503
2015/0351151 A1 * 12/2015 Huang .............. H04W 36/0085
370/252
2016/0359958 A1 * 12/2016 Delany ............... H04L 61/4511

OTHER PUBLICATIONS

Cisco, "Activity Search Report", https://docs.umbrella.com/deployment-umbrella/docs/the-activity-search-report Jun. 6, 2017, (Year: 2017).*

* cited by examiner

*Primary Examiner* — Nicholas R Taylor
*Assistant Examiner* — Ho T Shiu

(57) ABSTRACT

The present invention teaches a method for determining an accurate measure of unique download sessions in an environment where IP addresses are shared among multiple devices. According to a first preferred embodiment, the system of the present invention may analyze requested server log data to determine the number of unique client devices sharing the same IP addresses. The system may then dynamically adjust the length of lookback windows for each unique device based on observed download behavior and the number of user agents associated with each overlapping IP address.

8 Claims, 3 Drawing Sheets

Related U.S. Application Data continuation of application No. 16/869,569, filed on May 7, 2020, now Pat. No. 11,082,478.

(60) Provisional application No. 62/844,659, filed on May 7, 2019.

SYSTEM AND METHOD FOR USING A VARIABLE ANALYSIS WINDOW TO PRODUCE STATISTICS ON DOWNLOADABLE MEDIA

RELATED APPLICATIONS

The present application is a CONTINUATION of U.S. patent application Ser. No. 17/392,242 filed Aug. 2, 2021; which is a CONTINUATION of U.S. patent application Ser. No. 16/869,569 filed May 7, 2020 (now U.S. Pat. No. 11,082,478). Accordingly, the present application claims the benefit of U.S. patent application Ser. Nos. 17/392,242 and 16/869,569, and further claims the benefit of U.S. Provisional Application Nos. 62/844,671 and 62/844,659 both filed May 7, 2019 which are both hereby incorporated by reference in their entirety.

BACKGROUND AND FIELD OF THE PRESENT INVENTION

1. Field of the Present Invention

The present invention relates generally to a system and method for measuring downloads of electronic media within a networked system. More specifically, the present invention relates to a system and method for analyzing server-side delivery data via variable lookback windows to measure file downloads.

2. Background of the Invention

Podcasting is a method of distributing digital media, typically audio programs, via the Internet. Most commonly, podcasting distributes media files through a subscription model. This model typically uses an RSS or XML feed ("feed") to identify and deliver media files. The technology behind RSS allows a client to subscribe to RSS feeds to access media files (e.g. .MP3 files) uploaded by content producers. Access to the media files is typically provided through an "aggregator" (e.g. a web site containing links to media files such as iTunes) which allows clients to subscribe to a particular feed to receive new content as it becomes available. Direct access to selected media servers can also be used to access and download media files.

The commercial podcast industry relies primarily on advertising revenue to generate profits. These advertisements are normally embedded within each podcast download. For this reason, the counting of the number of unique individual downloads is necessary to value the amount of advertising delivered for each sponsor.

Presently, tracking companies analyze web server logs to count downloads for each stored media file as they are requested and/or accessed within set periods of time. This method provides a basic measure of downloads but fails to provide accurate counts when IP addresses are shared by multiple devices (i.e. dorms, office buildings etc.), and where some of those devices are identical and/or using identical user agents (aka—"signatures").

To overcome this difficulty, tracking companies rely on counting unique downloads within specific pre-set time frames. These time frames (aka—"analysis windows" or "lookback windows") are most commonly set to 24 hours. However, in the case of multiple devices sharing the same IP addresses and user agents for the same media files, this simplified approach undercounts download sessions when an overly-long window is used, and it overcounts download sessions when an overly-short window is used. What is needed is a new method which can provide a more accurate count of unique downloads both for unique and shared IP addresses.

SUMMARY OF THE PRESENT INVENTION

The present invention overcomes the limitations of the prior art by providing an algorithm for determining an accurate measure of unique download sessions in an environment where IP addresses are shared among multiple devices.

According to a first preferred embodiment, the system of the present invention may analyze requested server-side data (e.g.—log files) to determine the number of unique client devices sharing the same IP addresses. The system may then dynamically adjust the length of lookback windows for each unique device based on observed download behavior and the number of unique devices and user agents associated with overlapping IP addresses.

According to a further preferred embodiment, the present invention includes a method and algorithm for estimating IP overlap using server log file data, and then adjusting the duration of selected lookback windows based on the degree of IP overlap for each unique device. Under this approach, lookback windows are continuously adjusted for each unique device and the number of incorrectly split sessions are minimized. Thereafter, media file requests are then analyzed within the adjusted lookback windows to determine the unique download sessions per media file for each unique device.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
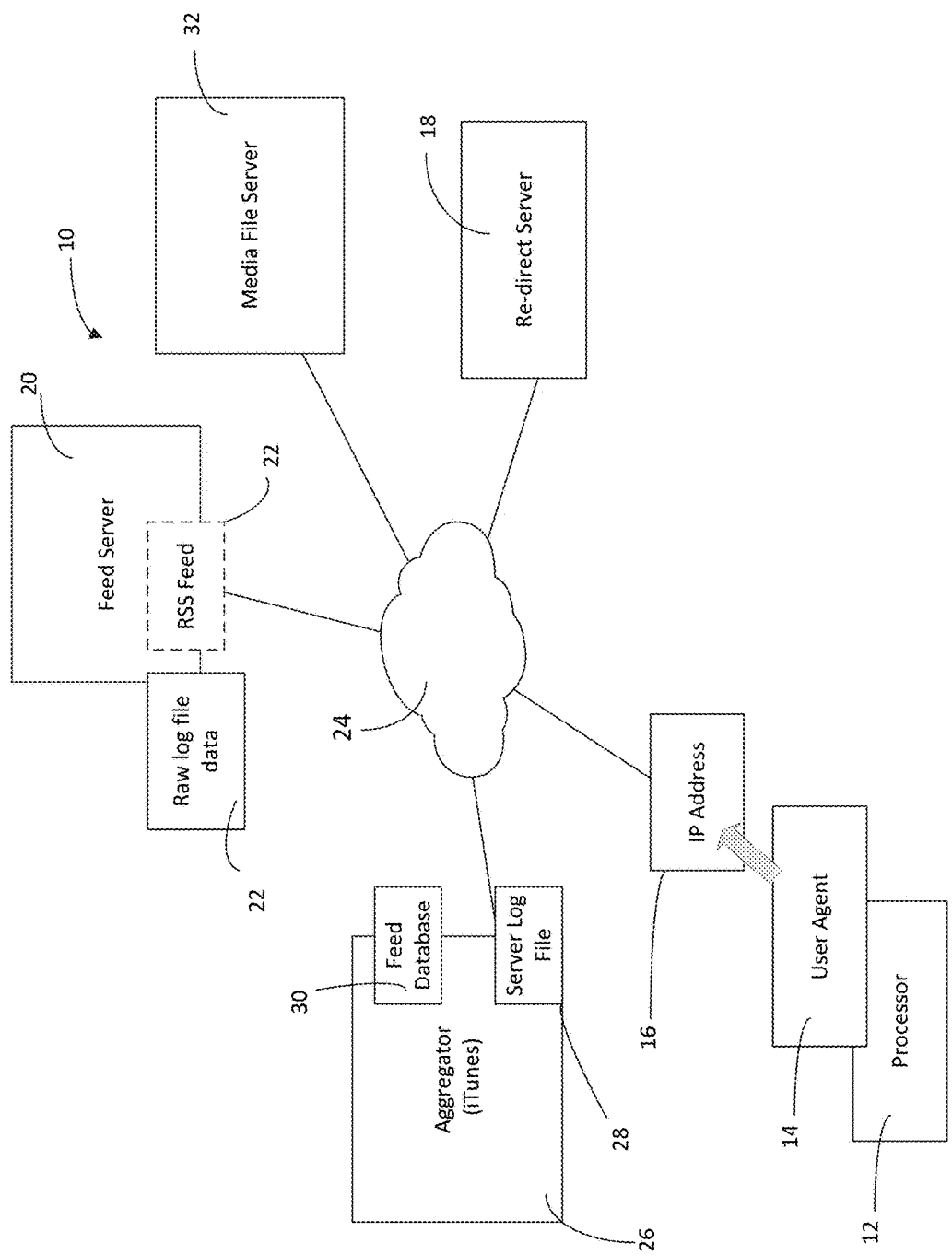
FIG. 1 shows a block diagram illustrating an exemplary network for use with the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," and the like as used herein, are defined as a sequence of instructions designed for execution on a computer or networked. A program, computer program, or software application may include a subroutine, a function, a procedure, an object implementation, an executable application, an applet, a servlet, a source code, an object code, a shared library, a dynamic load library and/or other sequence of instructions designed for execution on a computer system. The terms "processor," "module," "system," "subsystem," "domain," "engine," and the like as used herein are defined as a computer processor, set of processors, collection of computer elements or computer code for executing instructions within a computer or within a computer system. A "database," "data repository," "data store" and the like, as used herein, include many different types of computer readable media that allow a computer to store, organize and manage data on a data storage means. Such data storage means can include, for example, non-volatile memory, such as ROM, RAM, CD-ROM, DVD, and other permanent storage media. However, even volatile storage such a RAM, buffers, cache memory, and network circuits are contemplated to serve as such data storage means according to different embodiments of the present invention.

Further, the terms "podcast", "content", "media", or "media files" are intended to broadly encompass any type or category of computer-readable files and/or stored media, either singly or collectively. More specifically, these terms include such files or feeds in any format (e.g., .MP3, .MPEG, .WAV, .JPG) and containing any content (e.g., text-based, audible, visual or some combination thereof) that can be downloaded to a client without limitation. Additionally, the present application refers to the "downloading" of files. The term "downloading" in this context refers to any transmission of media including streaming, partial downloads and full downloads of files without limitation.

It should also be understood that throughout this disclosure, unless logically required to be otherwise, where a process or method is shown or described, the steps of the method may be performed in any order, repetitively, iteratively or simultaneously. As used throughout this application, the word "may" is used in a permissive sense (i.e., meaning "having the potential to'), rather than the mandatory sense (i.e. meaning "must"). Further, words using the singular or plural number also include the plural or singular number, respectively. Additionally, the words, 'herein,' 'hereunder,' 'above,' 'below,' and words of similar import refer to this application as a whole and not to any particular portions of this application. When the word 'or' is used in reference to a list of two or more items, that word covers all of the following interpretations of the word: any of the items in the list, all of the items in the list and any combinations of the items in the list.

With reference now to FIG. 1, a first exemplary system 10 which may be used to implement aspects of the present invention is provided. The exemplary system 10 includes a user agent 14 (e.g. web browser) running on a computing device or processor 12 (such as a personal computer, smart phone, PDA or the like). The user agent 14 is preferably coupled to the internet 24 from a given IP address 16. The processor 12 and user agent 14 preferably together include the software necessary to subscribe to podcasts provided by an aggregator/subscription service 26, or to download podcasts directly. The aggregator service 26 of the present invention may include any number of servers and networks.

The aggregator service 26 preferably includes a feed database 30 which includes a list of podcasts/feeds which may selected and linked to a given processor 12 and user agent 14. This list may be periodically refreshed and may include information links and other information identifying podcast content on a given feed 22. In addition, the aggregator service 26 may also include links to a range of content servers which the aggregator service 26 may use to store, host and link to media. The aggregator service 26 may also include a search engine which may perform multiple functions including crawling the network 10 to identify, retrieve and store feed data for searching by user agents 14.

The system 10 also may include any number of other re-directing servers 18 and other media servers 32 which may store, buffer and re-direct data traffic to enhance the seamless flow of data to a requesting user agent 14. Additionally, the system may include other 3rd party servers which may perform other services such as ad placement and the like. As shown, the feed server 20 preferably includes one or more feeds 22, such as RSS feeds, that are accessible through the network/Internet 24 as shown. Each feed 22 preferably includes information about a given set of media (i.e. podcasts) so that they can be retrieved by a user agent 14 either directly, or via the aggregator service 26 and/or another server 18, 32.

As shown, each processor 12 is preferably connected to each element of the network 10 via the Internet 24. Alternatively, different components of the present invention may be communicatively coupled differently, for example each may be coupled directly via VPN connections or the like. Additionally, each element of the network and their respective sub-elements/modules may be distributed so that certain functions may operate at various locations throughout the system 10. Thus, the description herein of a function or component being associated with a particular device or component or location is merely one possible embodiment.

Figure 2:
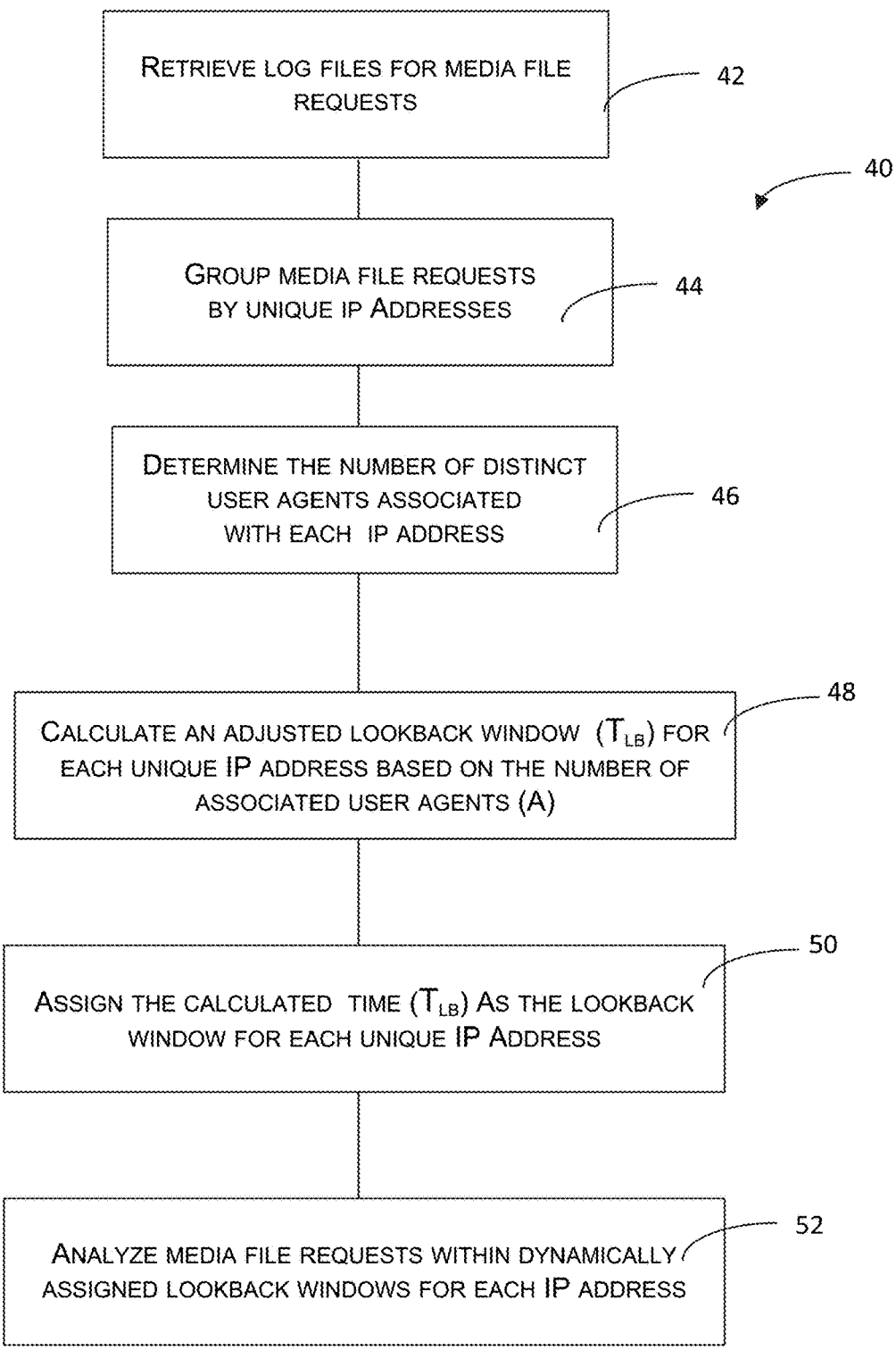
FIG. 2 shows a block diagram illustrating a preferred method in accordance with a first preferred embodiment of the present invention.

With reference now to FIGS. 1-2, a method 40 in accordance with a preferred embodiment of the present invention shall now be discussed. According to a first step 42, the system and method of the present invention preferably first collects server-side data (e.g.—in the simplest form, by retrieving logfiles from either a redirect server 36 or the media host 34) which are relevant to a given measurable time period of media downloads.

At a next step 44, the system and method of the present invention may analyze the log files to identify and group media file requests by unique IP addresses. For example, given the set of device downloads shown in FIG. 3, the system may retrieve a set of service log data as indicated in Table 1 below.

TABLE 1

Server Log File Data

| Device | User Agent | IP Address |
|--------|------------|------------|
| 1 | A | 216.3.128.12 |
| 2 | B | 216.3.128.12 |
| 3 | C | 216.3.128.12 |
| 4 | D | 216.3.128.12 |
| 5-8 | E | 216.3.128.12 |
| 9 | F | 156.12.122.1 |
| 10 | G | 75.79.945.80 |
| 11 | H | 474.95.01.45 |
| 12 | I | 548.4.88.005 |
| 13 | J | 111.2.04.002 |
| 14 | K | 111.2.04.002 |
| 15-20 | L | 111.2.04.002 |

At a next step 46, the system may then preferably determine the number of distinct user agents associated with each IP address (i.e. the degree of IP overlap). According to further preferred embodiments, the degree of IP overlap may be calculated in a variety of other ways. For example, the degree of IP overlap may be calculated based on the number of distinct files accessed by each IP address or the number of distinct shows/episode/podcasts accessed by each IP address. Applying this step to the retrieved data shown in Table 1, the system may preferably calculate the degree of IP overlap for each device as shown in Table 2 below.

TABLE 2

Degree of IP Overlap for Each Device

| Device | User Agent | IP Address | Degree of IP Overlap |
|---|---|---|---|
| 1 | A | 216.3.128.12 | 8 |
| 2 | B | 216.3.128.12 | 8 |
| 3 | C | 216.3.128.12 | 8 |
| 4 | D | 216.3.128.12 | 8 |
| 5-8 | E | 216.3.128.12 | 8 |
| 9 | F | 156.12.122.1 | 1 |
| 10 | G | 75.79.945.80 | 1 |
| 11 | H | 474.95.01.45 | 1 |
| 12 | I | 548.4.88.005 | 1 |
| 13 | J | 111.2.04.002 | 3 |
| 14 | K | 111.2.04.002 | 3 |
| 15-20 | L | 111.2.04.002 | 3 |

At a next step 48, the system of the present invention may then preferably calculate an adjusted lookback window ($T_{LB}$) for each unique IP address based on the degree of IP overlap calculated. According to a preferred embodiment, a standard 24-hour lookback window ($T_{Default}$) may be used as the default for each device. Depending on system traffic and other factors, different default times (e.g. 1-100 hrs.) may also be used without departing from the scope of the present invention. For example, default times for lookback windows maybe set to 48, 36, 24, 18, 10, 6, 4 or 2 hours.

According to a first preferred embodiment, the adjusted lookback window ($T_{LB}$) may be adjusted in inverse relation to the degree of IP overlap applicable to each device. According to a further preferred embodiment, the adjusted lookback window ($T_{LB}$) for each device may be calculated using an equation similar to Equation 1.1 below.

$$T_{LB} = \frac{T_{Default}}{\text{DEGREE OF IP OVERLAP}} \quad \text{Equation 1.1}$$

Applying Equation 1.1 to the example data extracted from FIG. 3 and listed in Table 2, the system of the present invention may calculate an adjusted lookback window ($T_{LB}$) for each device as listed in Table 3 below.

TABLE 3

Dynamically Calculated Lookback Windows

| Device | User Agent | IP Address | Degree of IP Overlap | Lookback Window ($T_{LB}$) (in hours) |
|---|---|---|---|---|
| 1 | A | 216.3.128.12 | 8 | 3 |
| 2 | B | 216.3.128.12 | 8 | 3 |
| 3 | C | 216.3.128.12 | 8 | 3 |
| 4 | D | 216.3.128.12 | 8 | 3 |
| 5-8 | E | 216.3.128.12 | 8 | 3 |
| 9 | F | 156.12.122.1 | 1 | 24 |
| 10 | G | 75.79.945.80 | 1 | 24 |
| 11 | H | 474.95.01.45 | 1 | 24 |
| 12 | I | 548.4.88.005 | 1 | 24 |
| 13 | J | 111.2.04.002 | 3 | 8 |
| 14 | K | 111.2.04.002 | 3 | 8 |
| 15-20 | L | 111.2.04.002 | 3 | 8 |

Preferably, the length of each lookback window used for each device is continuously defined for each IP address in accordance with the present invention. In this way, shorter lookback windows may be calculated and used to count unique media downloads for devices having a high degree of IP overlap. Conversely, longer lookback windows may be used when the degree of IP overlap is lower. Preferably, the default lookback window (e.g. 24 hours) may be used when no IP overlap exists (i.e. degree of IP overlap is equal to 1).

Preferably, the default lookback window is selected so that in the majority of cases, it is long enough that it does not erroneously split sessions. Thereafter, the system of the present invention preferably further calculates and dynamically assigns an adjusted lookback window for each device to maximize the number of distinct sessions that are correctly counted, and short enough to distinguish sessions from identical user agents behind the same IP addresses. According to the present invention, the larger the number of user agents behind a shared IP, the shorter the analysis window must be to arrive at an accurate count of unique clients downloading a media file.

Referring again to FIG. 2, at a next step 50, the system of the present invention may preferably assign the newly calculated time ($T_{LB}$) as the new adjusted lookback window for devices within each unique IP Address. At a next step 52, the system may then preferably analyze media file requests within the dynamically assigned lookback windows to calculate the number of unique media downloads generated by each device.

Figure 3:
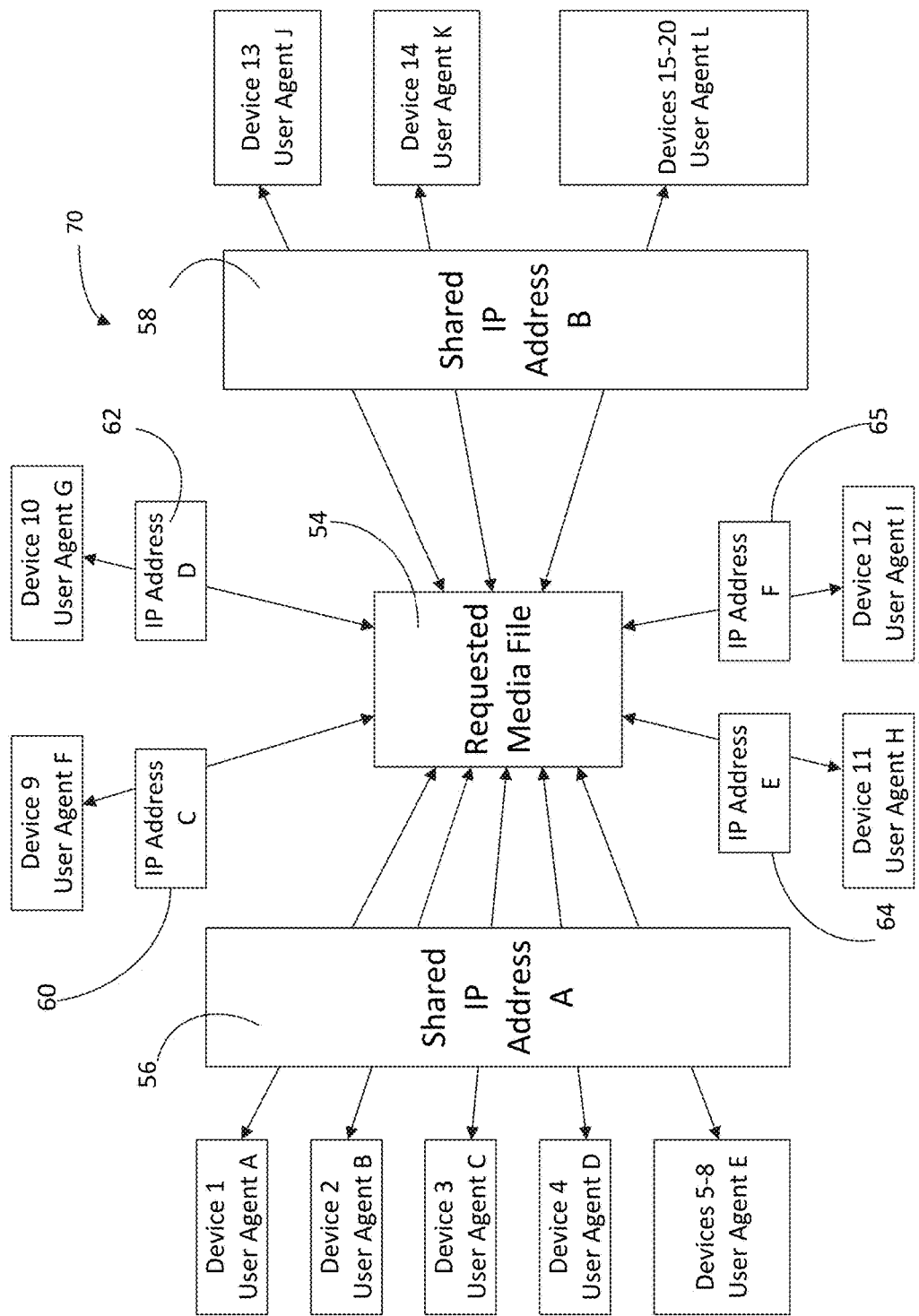
FIG. 3 shows a block diagram illustrating an exemplary communication arrangement for requesting a given set of media files.

With reference now to FIG. 3, the method of FIG. 2 shall be briefly discussed with reference to an exemplary communication arrangement 70. In FIG. 3, individual Devices 1-20 are shown requesting a download of a single media file 54 using six IP addresses A-F 56-65. As shown, Devices 1-8 each access the media file 54 through Shared IP Address A 56, with Devices 5-8 having the same user agent. As calculated in Table 3 above, these requests are more accurately counted within a shorter analysis window (i.e. 3 hours). With respect to Devices 9-12, these Devices each access the media file 54 through four unique IP addresses C-F 60-65. As calculated in Table 3 above, requests from each of these Devices 9-12 are more accurately counted using the standard analysis window of 24 hours.

With respect to Devices 13-20, these devices each access the media file 54 through Shared IP Address B 58, with Devices 15-20 having the same user agent. As shown in Table 3 above, requests from these devices 13-20 are more accurately counted with an analysis window of 8 hours as listed in Table 3 above.

While the above descriptions regarding the present invention contain much specificity, these should not be construed as limitations on the scope, but rather as examples. Further, while particular embodiments of the invention have been described, it will be understood that the invention disclosed is not limited thereto, since modifications may be made by those skilled in the art, particularly in light of the foregoing teachings. It is, therefore, contemplated by the appended claims to cover any such modifications that incorporate those features or these improvements which embody the spirit and scope of the present invention.

What is claimed is:

1. A method for calculating the number of distinct downloads of media files within a file delivery system which includes at least a media file or redirect server, and a system for communicating with a plurality of user agents, wherein the method comprises:

retrieving a first set of data comprising a plurality of media file requests for a first media file from a first set of unique devices; wherein each of the plurality of media file requests comprise: user agent identifier data, unique device data, request time data, requested media file identifier data, and IP address data;

creating a first set of adjusted lookback windows for the first set of unique devices; wherein the first set of adjusted lookback windows comprises at least a first adjusted lookback window created by reducing a first default lookback window based at least in part on a degree of IP overlap of a first user agent associated with a first requesting device;

assigning the first set of adjusted lookback windows to the first set of unique devices; wherein at least the first adjusted lookback window is assigned to the first requesting device; and calculating a number of unique media downloads generated by each of the first set of unique devices within the first set of adjusted lookback windows assigned to each unique device.

2. The method of claim 1, wherein the step of retrieving a first set of data comprises sending a data request to a file server log.

3. The method of claim 1, wherein the default lookback window comprises a 24-hour time period.

4. The method of claim 1, wherein the default lookback window comprises a time period selected from the group of time periods comprising: 48, 36, 24, 18, 10, 6, 4 and 2 hours.

5. The method of claim 1, wherein the default lookback window is within the range of 0.1-100 hours.

6. The method of claim 5, wherein at least one adjusted lookback window is determined by dividing the default lookback window by a calculated degree of IP overlap.

7. The method of claim 6, wherein the duration of each adjusted lookback window is continuously monitored and updated for each unique device.

8. The method of claim 7, wherein the default lookback window is used when the degree of IP overlap is equal to 1.

* * * * *